United States Patent [19]

Pearson

[11] Patent Number: 5,100,725
[45] Date of Patent: Mar. 31, 1992

[54] INSULATION AND HEAT REFLECTIVE BARRIER

[75] Inventor: Ben Pearson, Coppell, Tex.

[73] Assignee: Reflective Toppings, Inc., Grand Prairie, Tex.

[21] Appl. No.: 646,106

[22] Filed: Jan. 25, 1991

[51] Int. Cl.$^5$ .............................................. B32B 3/26
[52] U.S. Cl. .............................. 428/314.4; 428/314.8; 428/316.6; 428/317.1; 428/317.7
[58] Field of Search ............... 428/314.4, 314.8, 316.6, 428/317.1, 317.7

[56] References Cited

FOREIGN PATENT DOCUMENTS 597361  1/1948  United Kingdom ............ 428/316.6

*Primary Examiner*—William J. Van Balen
*Attorney, Agent, or Firm*—Arthur F. Zobal

[57] ABSTRACT

A radiant heat barrier layer is sandwiched between and bonded to two closed cell foam layers by non-heat conducting adhesive.

5 Claims, 2 Drawing Sheets

INSULATION AND HEAT REFLECTIVE BARRIER

FIELD OF THE INVENTION

The invention relates to an insulation and heat reflective material.

BACKGROUND OF THE INVENTION

A need exists for a thin, light weight material which effectively acts as a heat insulator and reflects radiant heat. Thermal barriers are known such as wool, goosedown, cotton, foam, flannel, nylon, and several other cloth composite materials. However, to my knowledge, none of these materials provide the dual role of being both an effective insulation and a radiant heat barrier.

SUMMARY OF THE INVENTION

It is an object of the invention to provide a thin, light weight material which creates its own air space and effectively acts as a heat insulator and reflects radiant heat.

The insulation and heat reflective barrier material comprises first and second closed cell foam layers, a radiant heat barrier layer located between said first and second closed cell foam layers, and a non-heat conducting adhesive bonding one side of said radiant heat barrier layer to the first closed cell foam layer and the other side of the radiant heat barrier layer to the second closed foam cell layer.

In the embodiment disclosed, the radiant heat barrier layer comprises at least one layer of aluminum.

DESCRIPTION OF THE PREFERRED EMBODIMENT

Figure 1:
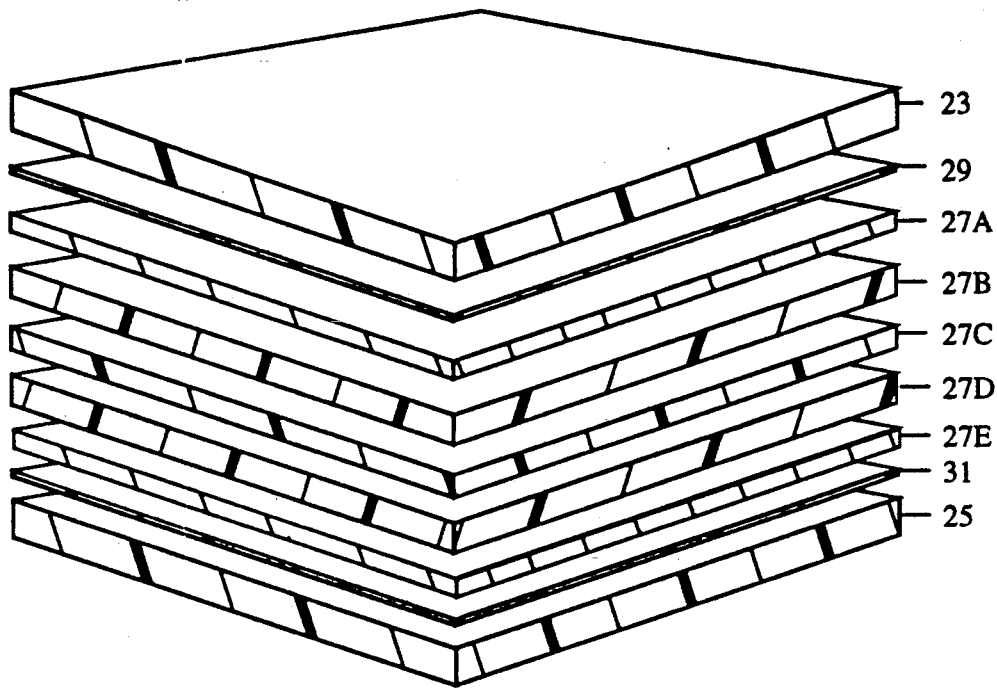
FIG. 1 is a partial cross-sectional exploded isometric view of the insulation and heat reflective material of the invention.
Figure 2:
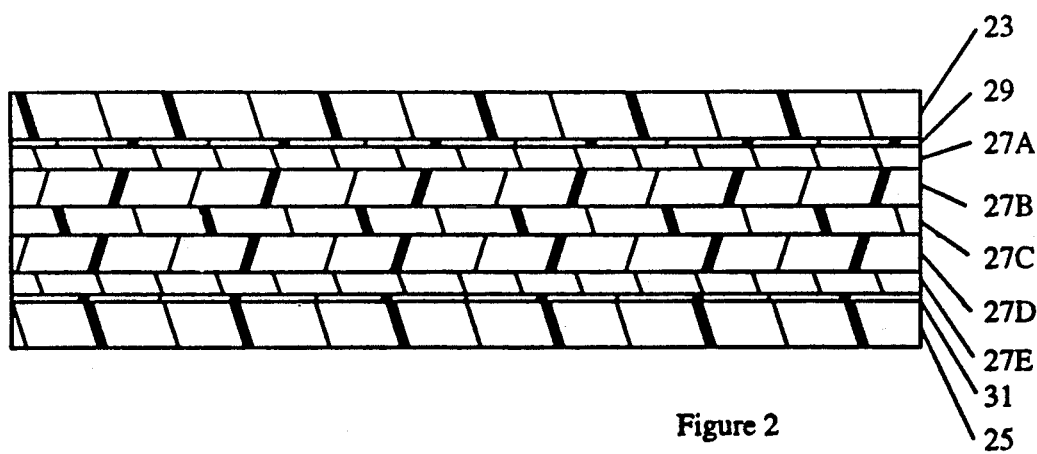
FIG. 2 is a cross-sectional view of the insulation and heat reflective material of the invention bonded together.
Figure 3:
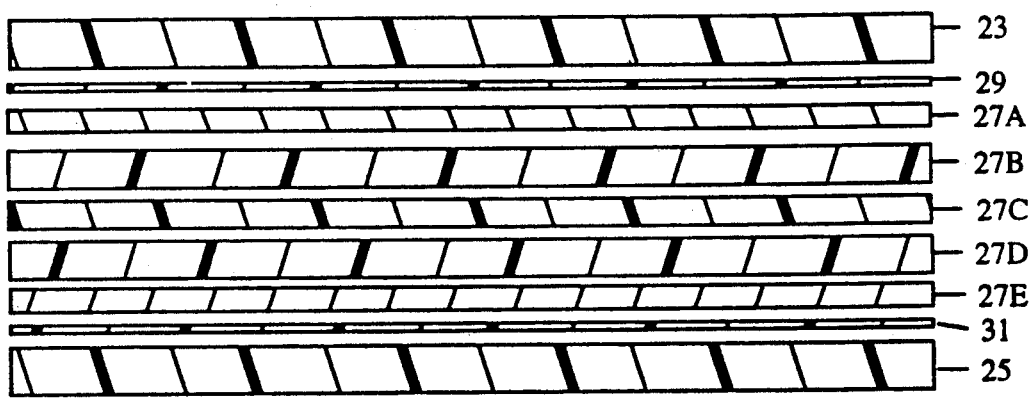
FIG. 3 is a cross-sectional exploded side view of the material of FIGS. 1 and 2.

Referring now to FIGS. 1-3, the material of the invention is identified by reference numeral 21. It comprises two closed cell foam layers 23 and 25 with a radiant heat barrier layer 27A, 27B, 27C, 27D, and 27E located between layers 23 and 25 and non-heat conducting adhesive layers 29 and 31 bonding the layer 27A-27E to one side of the layer 23 and to one side of the layer 25 respectively. Layers 23, 25, 27A-27E, and the adhesive 29 and 31 are commercial available products. The closed cell foam layers 23 and 25 are polyethylene foam available from Packaging Industries Group, Inc. Sintinel Foam Div., of Hyannis, MA. It is of 99% LD polyethylene. It may have a thickness of ¼ or 3/32 of an inch. The radiant heat barrier layer 27A-27E comprises aluminum foil layers 27A and 27E, polyethylene layers 27B and 27D and a polyester layer 27C, all bonded together. Each of the aluminum layers 27A and 27E is 99.5% pure industrial grade aluminum foil having a thickness of 0.00035 of an inch. The polyester film 27C is 48 gauge polyester film. The total thickness of the radiant heat barrier layer 27A-27E may be 0.003 of an inch. The radiant heat barrier layer 27A-27E is available from Industrial Packaging Corporation of Homer, LA. The heat insulation adhesive 29 and 31 in the preferred embodiment is Vinyl Acetate Homopolymer and Copolymer Emulsions in water and is of the chemical family of Polyvinyl Acetate Emulsions and is available from the Stegmeier Corporation of Arlington, TX.

In forming the composite multi-layer material 21, the adhesive 29 is applied to one side of the layer 23 and allowed to cure. The radiant heat barrier layer 27A-27E then is applied by pressure to the adhesive 29. The adhesive 31 is then applied to the second layer 25 and allowed to cure and is pressed on to the other side of the layer 27A-27E thus sandwiching the radiant heat barrier layer 27A-27E between the two closed foam layers 23 and 25. Layer 23 with the adhesive layer 29 effectively forms an air space. Similarly layer 25 and adhesive layer 31 effectively forms an air space. The air spaces allow the composite material to reflect radiant heat. Layers 23, 27A-27E and 25 are relatively flexible and the total composite material 21 is flexible and may have a thickness of ¼ of an inch, however the thickness may be greater. The length and width of the material 21 may vary and the maximum dimensions in length and width may be in the realm of yards. The product may be used as a raw material for building insulating, food and beverage bags, keg coolers, insulation under carpeting padding, wrap insulation around air conditioner chiller water lines, wrap insulation around existing heat and air conditioning supply lines, as floor mats for race cars and trucks, etc.

I have found that the composite material provides a very effective heat insulation and radiant heat reflective barrier which is easy to produce and is light weight and may be used for many purposes.

The composite material helps reduce radiant heat from entering or escaping and also aids to the insulation process at the same time. It may be used for application where air spaces are not possible yet a heat reflector is desired. The foam layers 23 and 25 create the air space which allows the radiant heat reflecting barrier 27A-27E to reflect not conduct heat.

Figure 4:
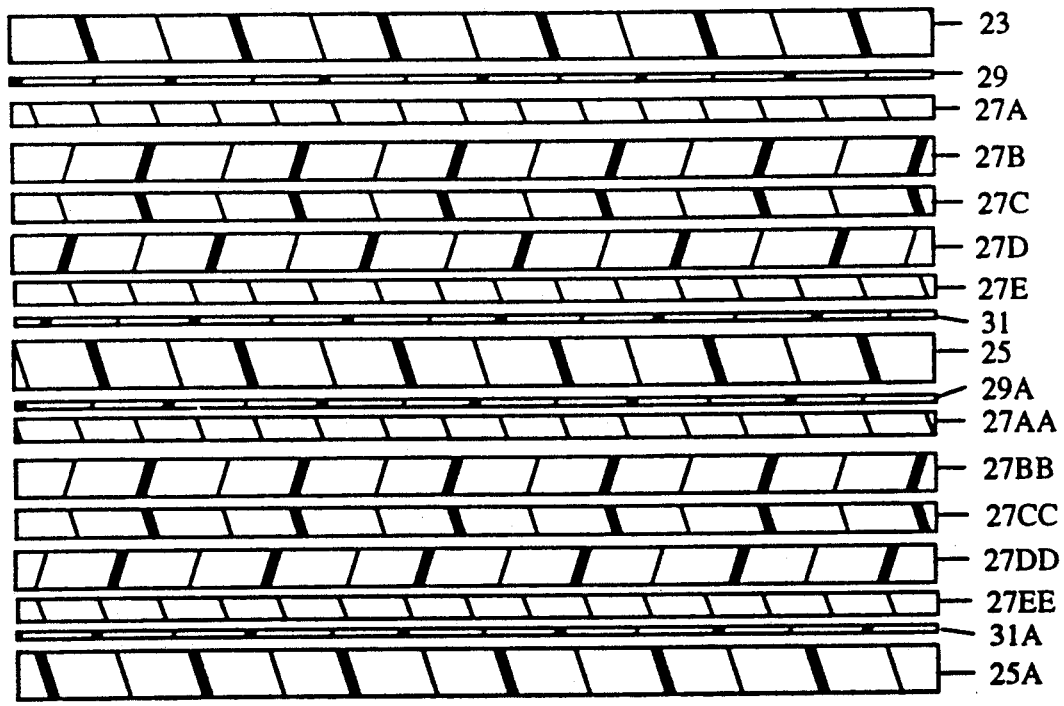
FIG. 4 is a partial cross-sectional exploded side view of another embodiment of the invention.

Referring to FIG. 4, the embodiment disclosed employs the same layers 23, 29, 27A-27E, 31 and 25 plus an additional radiant heat barrier layer 27A(A), 27B(B), 27C(C), 27D(D), and 27E(E) which is the same as the radiant heat barrier layer 27A-27E. The radiant heat reflective layer 27A(A)-27E(E) is bonded to the other side of layer 25 by adhesive 29A which is the same as adhesive 29. An additional closed cell foam layer 25A is bonded to the other side of the radiant heat reflective barrier layer 27A(A)-27E(E) by an adhesive layer 31A which is the sam adhesive 31.

I claim:

1. An insulation and heat reflective barrier, comprising:
   first and second closed cell foam layers,
   a radiant heat barrier layer located between said first and second closed cell foam layers, and
   a non-heat conducting adhesive bonding one side of said radiant heat barrier layer to said first closed cell foam layer and to the other side of said radiant heat barrier layer to said second closed cell foam layer.

2. The insulation and heat reflective barrier of claim 1 wherein said radiant heat barrier layer comprises at least one layer of aluminum.

3. The insulation and heat reflective barrier of claim 2 wherein said radiant heat barrier layer comprises two layers of aluminum foil bonded to two layers of polyethelyne respectively which are bonded to a layer of polyester located therebetween.

4. The insulation and heat reflective barrier of claim 1 wherein said adhesive comprises vinyl acetate homopolymer and copolymer emulsions in water.

5. The insulation and heat reflective barrier of claim 3 wherein said adhesive comprises vinyl acetate homopolymer and copolymer emulsions in water.

* * * * *